US011896858B2

(12) United States Patent
Barrows et al.

(10) Patent No.: US 11,896,858 B2
(45) Date of Patent: Feb. 13, 2024

(54) FIRE EXTINGUISHER WITH INTERNAL MIXING AND GAS CARTRIDGE

(71) Applicant: RUSOH, Inc., Eau Claire, WI (US)

(72) Inventors: Ryan H. Barrows, Eau Claire, WI (US); Justun C. Seymour, Eau Claire, WI (US); Hector Rousseau, Riverside, CA (US); Randy Rousseau, Riverside, CA (US)

( * ) Notice: Subject to any disclaimer, the term of this patent is extended or adjusted under 35 U.S.C. 154(b) by 123 days.

(21) Appl. No.: 17/151,525

(22) Filed: Jan. 18, 2021

(65) Prior Publication Data

US 2021/0138282 A1 May 13, 2021

Related U.S. Application Data

(63) Continuation of application No. 15/975,100, filed on May 9, 2018, now Pat. No. 10,926,119, which is a continuation-in-part of application No. 14/704,820, filed on May 5, 2015, now Pat. No. 9,993,673, which is a continuation-in-part of application No. 14/313,761, filed on Jun. 24, 2014, now Pat. No. 10,350,443.

(51) Int. Cl.
*A62C 13/70* (2006.01)
*A62C 13/00* (2006.01)
*A62C 13/74* (2006.01)

(52) U.S. Cl.
CPC ............ *A62C 13/70* (2013.01); *A62C 13/006* (2013.01); *A62C 13/74* (2013.01)

(58) Field of Classification Search
CPC ....... A62C 13/006; A62C 13/66; A62C 13/68; A62C 13/70; A62C 13/72; A62C 13/74; A62C 13/76; B01F 7/00091; B01F 7/00125; B01F 7/00133; B01F 7/11141
USPC ............................ 169/71, 72, 75, 85, 87, 88
See application file for complete search history.

(56) References Cited

U.S. PATENT DOCUMENTS 674,827 A 5/1901 Edmands
907,029 A 12/1908 Giseke
1,272,012 A 7/1918 Connor
1,354,093 A 9/1920 Davidson
1,733,724 A 10/1929 Downs
1,790,231 A 1/1931 Dugas
1,976,056 A 10/1934 Wright
2,017,319 A 10/1935 Mcmullen
2,067,829 A 1/1937 Dennel
(Continued)

FOREIGN PATENT DOCUMENTS

BE 846754 9/1976
CN 201603325 10/2010
(Continued)

*Primary Examiner* — Jason J Boeckmann
(74) *Attorney, Agent, or Firm* — Kirk A. Buhler; Buhler & Associates

(57) ABSTRACT

Improvements to a portable fire extinguisher are disclosed. The improvements allow for frequent and simplified maintenance of a fire extinguisher with minimal training and without need for custom equipment. The improvements include an anti-bridging mechanism that can be articulated from the exterior of the chamber to fluff, mix or stir the powder within the chamber to keep it in a liquefied state. These features will extend the service intervals while maintaining the fire extinguisher in a ready condition.

20 Claims, 6 Drawing Sheets

(56) References Cited

U.S. PATENT DOCUMENTS

| | | | | |
|---|---|---|---|---|
| 2,430,470 | A | 11/1947 | Keefe, Jr. | |
| 2,533,685 | A | 6/1949 | Nurkiewicz | |
| 2,489,339 | A | 11/1949 | Stroop | |
| 2,541,554 | A | 2/1951 | Smith | |
| 2,569,975 | A | 10/1951 | Cone | |
| 2,592,029 | A | 4/1952 | Hansen | |
| 2,610,609 | A | 9/1952 | Allen | |
| 2,785,759 | A | 3/1957 | Fleming et al. | |
| 3,149,677 | A | 9/1964 | Blair | |
| 3,251,420 | A | 5/1966 | Rodgers | |
| 3,255,824 | A | 6/1966 | Rodgers | |
| 3,618,669 | A | 11/1971 | Sachs | |
| 3,666,016 | A | 5/1972 | Estes | |
| 3,667,549 | A * | 6/1972 | Sachs | A62C 13/70 169/85 |
| 3,713,493 | A | 1/1973 | Hansen | |
| 3,719,232 | A | 3/1973 | Gubela | |
| 3,858,659 | A | 1/1975 | Fukushima | |
| 4,372,394 | A | 2/1983 | Allegri, Sr. | |
| 4,505,336 | A | 3/1985 | Thevis et al. | |
| 4,567,948 | A | 2/1986 | Rozniecki | |
| 4,650,004 | A | 3/1987 | Wendling et al. | |
| 4,705,064 | A | 11/1987 | Self | |
| 4,862,968 | A | 9/1989 | Woodman | |
| 6,189,624 | B1 | 2/2001 | James | |
| 6,378,740 | B1 | 4/2002 | Martin | |
| 6,527,058 | B1 | 3/2003 | Nerat | |
| 7,128,163 | B1 | 10/2006 | Rousseau et al. | |
| 9,144,699 | B1 | 9/2015 | Wang | |
| 2004/0118576 | A1 | 6/2004 | Kato et al. | |
| 2004/0166266 | A1 | 8/2004 | De Wit | |
| 2005/0060953 | A1 | 3/2005 | Altonen et al. | |
| 2006/0032642 | A1 | 2/2006 | Jacobson | |
| 2007/0102167 | A1 | 5/2007 | Rousseau | |
| 2007/0287193 | A1 * | 12/2007 | Pressman | B01F 27/88 436/178 |
| 2009/0188681 | A1 * | 7/2009 | Chang | A62C 13/006 169/30 |
| 2012/0031631 | A1 * | 2/2012 | Rousseau | A62C 13/66 169/30 |

FOREIGN PATENT DOCUMENTS

| | | |
|---|---|---|
| EP | 0298022 | 1/1989 |
| EP | 1961458 | 4/2011 |
| FR | 2290920 | 6/1974 |
| GB | 365277 | 1/1932 |
| GB | 387051 | 2/1933 |
| GB | 447936 | 5/1936 |
| GB | 696702 | 9/1953 |
| GB | 1199139 | 7/1970 |
| GB | 1259261 | 1/1972 |
| JP | 09225056 | 9/1997 |
| RU | 2209101 | 7/2003 |
| WO | 2001047603 | 7/2001 |

* cited by examiner

FIRE EXTINGUISHER WITH INTERNAL MIXING AND GAS CARTRIDGE

CROSS REFERENCE TO RELATED APPLICATIONS

This application is a continuation of application Ser. No. 15/975,100 filed May 9, 2018 which is a continuation-in-part of application Ser. No. 14/704,820 filed May 5, 2015, now U.S. Pat. No. 9,993,673, and is a continuation-in-part of application Ser. No. 14/313,761 filed Jun. 24, 2014, now U.S. Pat. No. 10,350,443, the entire contents of which are hereby expressly incorporated by reference herein in their entirety.

TECHNICAL FIELD

This invention relates to improvements in portable fire extinguishers. More particularly, the present invention relates to a fire extinguisher that uses a replaceable gas cartridge that provides a propellant to push fire extinguishing media outside of the fire extinguisher.

BACKGROUND

Most portable fire extinguishers are of a similar design where the fire extinguishing powder is contained in a continuously pressurized chamber. Fire extinguishers of this type require scheduled maintenance by trained and certified technicians with certification issued by the fire marshal for each state. This maintenance involves discharging, cleaning, and refilling the extinguisher. If not done periodically, the powder within the chamber becomes compacted and/or the pressure within the chamber may leak and be insufficient to propel the powder out of the dispensing nozzle. If maintenance is not done correctly, moisture absorption by the extinguishing powder will cause caking and block the dispensing nozzle. The aforementioned conditions would prevent the proper dispensing of extinguishing powder when needed.

Current extinguishers are open to wear and tear because of the constant pressure and tear down process. When serviced they are discharged into a recycling chamber and all the parts must be disassembled and cleaned. All the pressure rings must be replaced and every part must then be re-assembled with new powder being placed within the chamber prior to pressurizing the chamber. The servicing of current fire extinguishers often creates more wear and tear on the fire extinguisher than when it is used to extinguish a fire.

U.S. Pat. No. 6,189,624 issued to James on Feb. 20, 2001 and Japan Patent Number JP 9,225,056 issued to Yamazaki Tomoki on Sep. 2, 1997 discloses fire extinguishing mechanisms where the chamber is not continuously pressurized, and the pressurized cartridge is a separate entity integrated within the chamber. While these patents disclose a separate pressurized cartridge, the cartridge is not located in a position that is easy to service, replace, or inspect. This minimizes the ability to determine the charge level of the pressurized cartridge.

U.S. Pat. No. 2,541,554 ("US '551") issued to C H Smith on Feb. 13, 1951 and Russian Patent Number RU 2,209,101 ("RU '101") issued to Glavatski G. D. Et Al. Nov. 2, 2002 discloses a fire extinguisher with an external CO2 gas cartridge. In the case of US '554 the CO2 gas cartridge sits on top of the fire extinguisher chamber and is not integrated within the handle of the fire extinguisher. In the case of RU '101 the CO2 gas cartridge is external to the extinguisher and is connected to the extinguisher with a pipe or hose. While both of these patents disclose a CO2 cartridge that is external to the chamber, neither of them is placed in the handle to allow a configuration of the fire extinguisher that is simple to inspect and replace.

U.S. Pat. No. 7,128,163 issued on Nov. 21, 2006, U.S. Pat. No. 7,318,484 issued on Jan. 15, 2008 and U.S. Pat. No. 7,793,737 issued Sep. 14, 2010, all to Hector Rousseau disclose a fire extinguisher with a gas cartridge in the handle and a fluffing mechanism. While these patents have similar features, the gas cartridge is oriented to discharge vertically upwards. When gas is discharged from a cartridge containing compressed liquefied gas, such as CO2, evaporation must occur from the contained liquid in order to maintain thermodynamic equilibrium with the cartridge. Heat is required to drive the evaporation, and if the available heat from the surrounding cartridge environment is insufficient, the compressed liquefied gas temperature and pressure will drop. For CO2, if the pressure drops below 75 psig, liquid CO2 will solidify into dry ice. Since cartridge-style fire extinguishers are usually used immediately after puncturing the cartridge, any dry ice formed will not have time to absorb enough heat to phase change into gas and contribute to the effective discharge of the fire extinguisher. This effect is magnified at low environmental temperatures, where existing commercial cartridge-style fire extinguishers have been measured to waste 40% by mass of the CO2 charge when conditioned at −40° C. However, even though this gas is unused during typical discharge, the extinguisher must be structurally designed based on the full pressurizing gas load, leading to less than optimal designs. In addition, based on the unique properties of CO2, torturous paths between the fire extinguisher main chamber and the cartridge must be avoided to minimize the risk of blocking the flow path with dry ice or freezing valves due to resulting low temperatures from CO2 expansion.

Due to the pressurized condition that exists with pressurized fire extinguishers, the opening where powder is placed into the extinguisher is limited due to the structural requirement to maintain pressure within the chamber at all times. The proposed application eliminates this need by providing an external gas cartridge, thus allowing the chamber to exist in a normally un-pressurized condition. Because the chamber is not under pressure the top opening of the extinguisher can be enlarged to allow easier filling of the fire extinguisher with powder, or checking the amount and or condition of the powder within the chamber.

What is needed is a fire extinguisher with a replaceable gas cartridge where the gas cartridge is oriented to discharge only liquid propellant into the body of the extinguisher and the fire extinguisher further has a fluffer that is accessible from outside the chamber, and the chamber has an enlarged top opening for filling the extinguisher. The proposed fire extinguisher provides this solution by providing a fire extinguisher with an external gas cartridge oriented to discharge downward, external mechanism to actuate an internal fluffer, and a large opening. By discharging the compressed liquefied gas downward, liquid is discharged into the fire extinguisher, and as such, the cartridge does not need to absorb nearly as much heat to drive the necessary evaporation to maintain temperature and pressure within the cartridge above the triple point, and thus, solidification of the propellant is avoided. For compressed liquefied CO2, this concept has been experimentally demonstrated to discharge nearly 100% of the CO2 from the cartridge, even with the fire extinguisher preconditioned to −40° C.

SUMMARY

It is an object of the fire extinguisher to eliminate the need for service personnel to enter secure areas. The extinguisher can have a higher level of service; can be operated by automatic "self-service" and or manually serviced by the owner or end user. This eliminates the need for non-employees to enter the privacy of business and government areas. This extinguisher can be operated, maintained, refilled, and charged with minimal training and without need for custom equipment.

The reduced outside servicing and maintenance of the fire extinguisher is ideal for placement of the fire extinguisher in secure areas. This will reduce or eliminate the possibility that a terrorist could utilize the fire extinguisher as a weapon, or use false identity as an extinguisher service person to gain access to a secure area.

It is an object of the fire extinguisher to provide a fire extinguisher with an external gas cartridge. The inverted external gas cartridge allows the liquid within the gas cartridge to vent directly into the fire extinguisher. Well accepted gas cartridges, such as CO2 or nitrogen cartridges, that are used in other applications can be adapted to operate with the fire extinguisher. Since the gas cartridge is external to the chamber it can be easily replaced or swapped without replacing the entire fire extinguisher. This provides a tremendous benefit when a large number of fire extinguishers need to be serviced at one time.

It is another object of the fire extinguisher to provide a fire extinguisher with an optional externally accessible fluffing mechanism. The size, structure and necessity of the fluffing mechanism can be based upon the size of the fire extinguisher. The externally accessible fluffing mechanism promotes anti-bridging of the powder within the chamber to keep it fluffed, agitated, stirred or disturbed to prevent caking of the powder and keep the powder in a liquefied state to ensure proper discharge onto a fire. The fluffing is accomplished with paddles, flapper, chains rods or other mixing mechanisms located within the chamber. The mixing mechanism is accessed by a connection on the top, bottom or side of the chamber and can be either manually operated or operated with a tool of some type.

It is still another object of the fire extinguisher to provide a fire extinguisher with an enlarged filling opening. The enlarged filling opening makes it easier and faster to fill and or empty the chamber. The top can also be easily removed to visually inspect the condition of the powder within the chamber.

It is still another object of the fire extinguisher to provide a quick opening and closing top housing thereby allowing a user to quickly open and refill the fire extinguisher. This also allows a fire fighter the load the desired fire extinguishing media based upon the type of fire.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

These and other features and advantages of the present invention will become better understood with regard to the following description and accompanying drawings in which.

Figure 1:
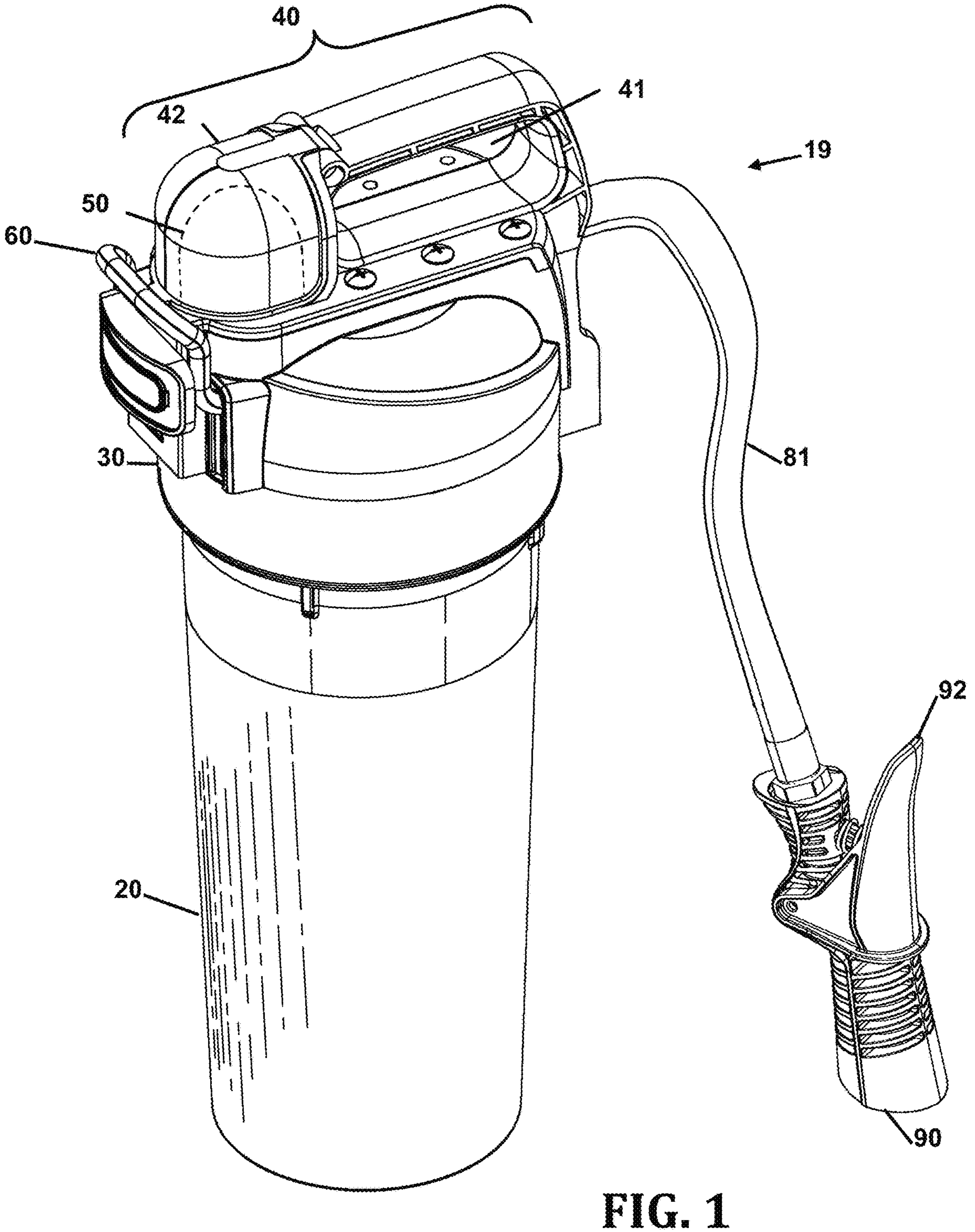
FIG. 1 shows a perspective view of a fire extinguisher according to an exemplary embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 shows an exterior perspective view of the fire extinguisher 19. The fire extinguisher 19 is substantially a cylindrical shape with a bottom housing 20 and top housing 30. In the preferred embodiment the bottom housing 20 and top housing 30 is made from a lightweight resilient material such as plastic, but could also be made of other materials, including steel, brass, copper or aluminum. The bottom housing 20 may further be fabricated from a transparent material to allow for visual inspection within the fire extinguisher 19. The top housing 30 is screwed onto the bottom housing 20, but it could also be attached with a bayonet or latching mechanism. The bottom housing 20 has an enlarged opening to allow easier filling of the bottom housing 20 with fire suppressant materials. A wall hanging mechanism can be incorporated into the top housing 30 of the fire extinguisher 19, or could wrap around the body of the bottom housing 20, or could fork the top housing 30 of the fire extinguisher 19.

Figure 2:
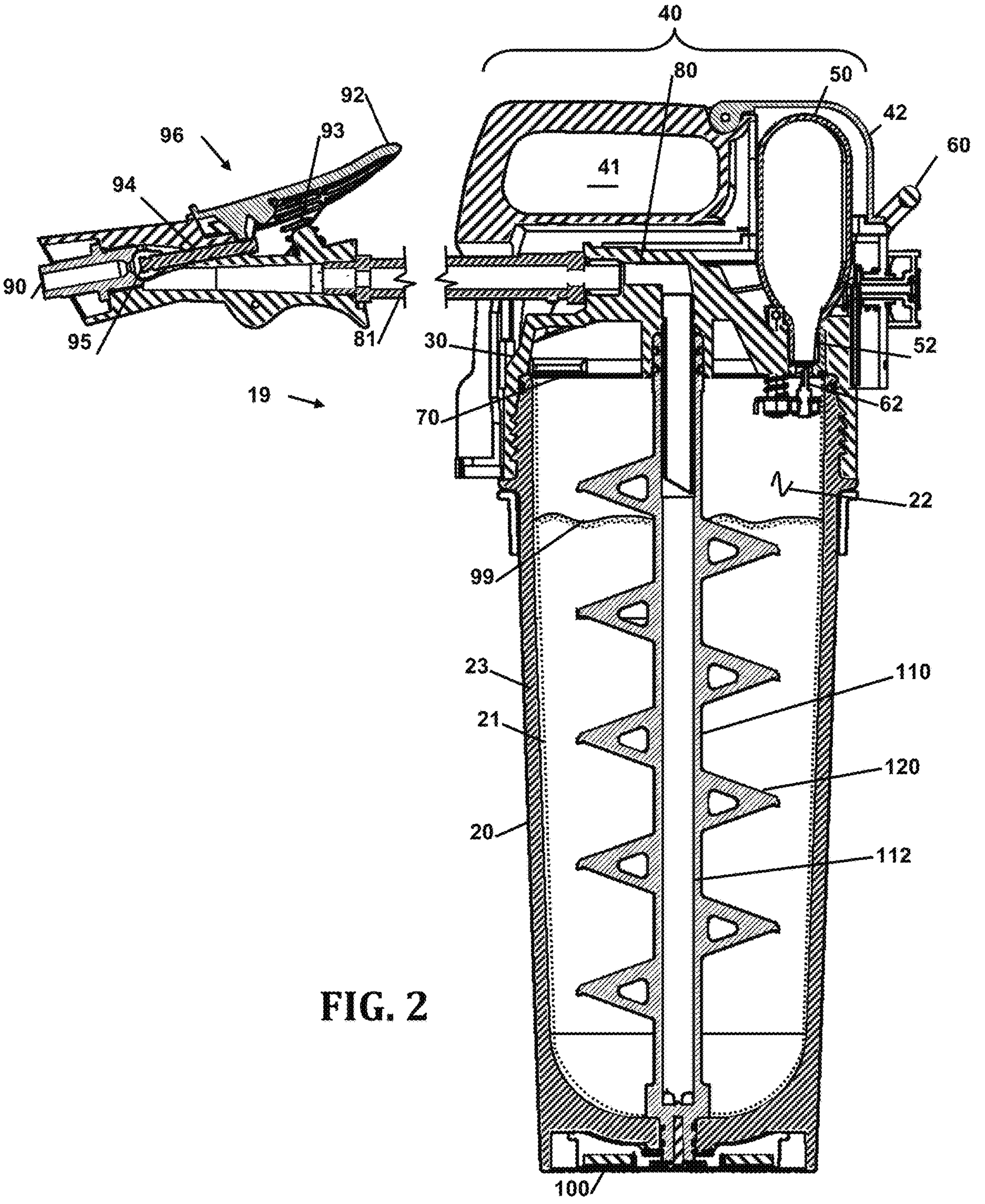
FIG. 2 shows a cross-sectional view of a fire extinguisher according to an exemplary embodiment.

With reference to FIGS. 1 & 2, a handle 40 allows the operator to hold the fire extinguisher 19 by placing a hand through the grip area 41. This allows the fire extinguisher 19 to be held in an upright orientation when it is being transported or used. The fire extinguisher 19 can also be stored and or transported in the upright orientation, but the upright orientation is not critical for the storage or operation of the fire extinguisher 19. Partially within the handle 40 and top housing 30 a replaceable pressurized gas cartridge 50 is located under a transparent portion 42 of an enclosing cover 44 of the handle 40. The transparent portion 42 provides the ability to verify that the pressurized gas cartridge 50 is installed within the fire extinguisher 19. While in the preferred embodiment the pressurized gas cartridge 50 is shown partially within the handle 40 and top housing 30 other locations are contemplated.

The replaceable pressurized gas cartridge 50 consists essentially of a compressed gas cartridge of CO2, but cartridges of different types of gas are possible that do not promote spreading of a fire. Because the gas within the cartridge is under high pressure and possibly in a liquid state, a small cartridge of propellant is required to expel the internal fire suppressant material 99 of the fire extinguisher 19. It is also contemplated that multiple gas cartridges can be used to accommodate a larger fire extinguisher without deviating from the inventive nature of the design. Pressurized gas cartridges are available and can be replaced or serviced without the need to service the entire fire extinguisher 19. The handle 40 and the enclosing cover 44 provides protection to the pressurized gas cartridge 50 in the event the fire extinguisher 19 is dropped or roughly handled. The enclosing cover 44 can have a transparent portion 42 that allows for visual inspection of the pressurized gas cartridge 50. A trigger mechanism 60 activates the pressurized gas cartridge 50 to pressurize the chamber 22 and expel the fire suppressant material 99 into and out of the flexible hose 81 and exit port 90.

While some figures in this document show and describe a flexible hose 81, some contemplated embodiments may include a duct, hollow passage or nozzle 97 where the fire extinguishing media passes from the body of the fire extinguisher out of the nozzle 97 to extinguish a fire. A control valve lever 92 opens and closes the exit port 90 or to prevent fire suppressant material 99 from pouring out of the extinguisher when the chamber is pressurized. When a nozzle 97 is used, a control valve can be located near the nozzle to control the flow of fire extinguishing media out of the fire extinguisher. The puncturing mechanism of the pressurized gas cartridge and the path from the gas cartridge 50 into the chamber 22 is shown and described in FIG. 2.

FIG. 2 shows a cross-sectional view of fire extinguisher 19. An operator can place their hand or glove through the grip area 41 of the handle 40 to carry, transport or use the fire extinguisher 19 with either hand. Fire suppressant material 99 is placed into chamber 22 within the bottom housing 20 through an enlarged cylindrical opening 70 when the top housing 30 is disengaged from the bottom housing 20. Over time the fire suppressant material 99 will become compressed and compacted in the bottom of the chamber 22. When the fire suppressant material 99 is compacted, risk of improper discharge increases. Within the fire extinguisher 19 a plurality of fluffing arms 120 are arranged on a central shaft 110. A fluffing wheel 100 can be accessed from the underside of the fire extinguisher 19. Rotating the fluffing wheel 100 will re-fluff the fire suppressant material 99 to minimize risk of improper discharge of suppressant material 99 from the fire extinguisher 19. Turning the fluffing wheel 100 will provide similar loosening of the fire suppressant material 99 as might be found in a food mixer.

Polycarbonate is a cost-effective candidate for providing a transparent bottom housing 20, however when polycarbonate is in contact with ammonia gas that is the main constituent of ABC dry chemical, material degradation will occur, especially at elevated temperatures, there is a need to isolate or protect the polycarbonate from direct exposure. When using polycarbonate material, the interior of the bottom housing 20 is preferably coated with a transparent protection coating 21 with a Siloxane base, or equivalent. This coating 21 improves chemical and abrasion resistance as well as provides UV protection. The coating 21 can be applied in any number of methods to isolate the polycarbonate exposure to Monoammonium phosphate and any emitted ammonia gas. The coating 21 would provide necessary chemical resistance whereas the polycarbonate bottom housing 20 would provide necessary strength and impact resistance.

In another contemplated embodiment, construct the bottom housing 20 as a transparent cylinder from two separate cylinders where the inner cylinder 21 is inserted into the outer cylinder 23 of bottom housing 20. This could be accomplished by insert molding a transparent inner cylinder of tritan, acrylic, san or an equivalently performing other material into the polycarbonate outer cylinder 23. The outer cylinder 23 of would be polycarbonate, and would serve to provide the assembly with necessary strength and impact resistance, whereas, the inner cylinder 21 would provide the necessary chemical resistance to Monoammonium phosphate. For these embodiments the strength of the inner cylinder 21 could be sufficient to ensure safe operation in the event outer cylinder 23 of bottom housing 20 is damaged from a severe environment or impact.

To expel fire suppressant material 99 from within the fire extinguisher 19 an operator must puncture the pressurized gas cartridge 50. The pressurized gas cartridge 50 is secured by threads 52 or otherwise secured into the top housing of the fire extinguisher 19. Within the top housing 30 a replaceable pressurized gas cartridge 50 is located under a transparent portion 42 of handle 40. The handle 40 and its enclosing cover 44 that may have a transparent portion 42 provides protection to the pressurized gas cartridge 50 in the event of the fire extinguisher being dropped, and also allows the operator to verify that the pressurized gas cartridge 50 is installed within the fire extinguisher 19. To puncture the pressurized gas cartridge 50, the operator lowers or rotates the trigger mechanism 60 that pushes the puncture pin 62 into the pressurized gas cartridge 50. Details of the trigger mechanism 60 and the puncture pin 62 is shown and described in more detail in FIGS. 6 and 7. Once the pressurized gas cartridge 50 is punctured the gas and or liquid will be forced into the chamber 22.

When liquefied gas is discharged from pressurized gas cartridge 50, evaporation must occur from the contained liquid in order to maintain thermodynamic equilibrium within the pressurized gas cartridge 50. To maintain thermodynamic equilibrium heat is required to drive the evaporation. If the available heat from the surrounding cartridge environment is insufficient the compressed liquefied gas temperature and pressure will drop. For liquefied CO2, if the pressure drops below 75 psig, the liquid CO2 will solidify into dry ice. If dry ice forms, the dry ice will not have time to absorb enough of the surrounding thermal mass to heat the dry ice to change phase into gas and contribute to the effective discharge of the fire extinguisher 19.

The forming of dry ice is exacerbated in low temperatures. Testing agencies such as UL, CSA, and others require operation of a fire extinguisher at temperatures down to −40° C. (−40° F.). If a pressurized gas cartridge with CO2 is oriented with the discharge port vertical in an upright position (i.e., with threads 52 in the upper position), testing has shown that up to 40% of the CO2 (by mass) can remain in the form of dry ice after completion of the fire extinguishers' discharge. When the pressurized gas cartridge 50 contains CO2 and is oriented in an inverted orientation (i.e., with threads 52 in the lower position), the cartridge does not need to absorb nearly as much heat to evaporate the liquid CO2 from the pressurized gas cartridge 50 to maintain temperature and pressure above the triple point, and thus, creation of dry ice within the cartridge 50 is avoided. This concept has been experimentally demonstrated to discharge nearly 100% of the CO2 from the cartridge, even with the fire extinguisher preconditioned to −40° C. (−40° F.). Once the $CO_2$ enters the chamber 22, there is sufficient heat and surface area in the comparatively large volume to rapidly convert liquid $CO_2$ into gaseous $CO_2$.

The mixture of fire suppressant material 99 and gas are pushed through the central shaft 110 and then through the flow path 80 in the top housing 30 where they are pushed through hose 81 to a manually operable valve 95 and are expelled out of the exit port 90. The central shaft 110 has an integral siphon tube 112 where fire suppressant material 99 is pushed into multiple holes in the bottom of the central shaft 110 through integral siphon tube 112. The dispensing nozzle 96 has a valve 95 that is operated with a control rod 94 to open and close the operable valve 95. The control rod 94 holds the valve 95 closed with a spring 93. An operator depresses the control valve lever 92 to overcome the spring 93 and opens the valve 95. The dispensing nozzle 96 can be operated by either hand. This is shown and described in more detail in FIG. 3.

Figure 3:
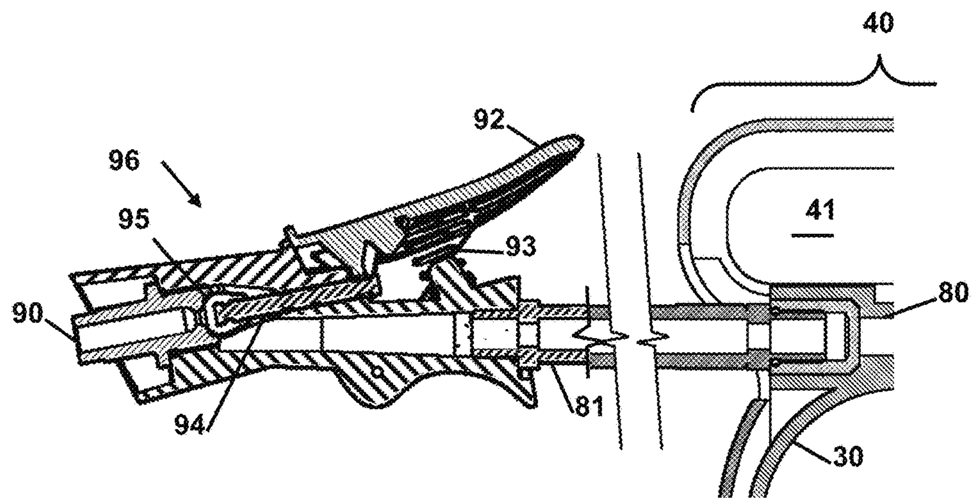
FIG. 3 shows a detailed view of a dispensing valve according to an exemplary embodiment.

FIG. 3 shows a detailed view of the dispensing nozzle 96. This view shows a portion of the handle 40 and the grip area 41. The top housing 30 includes a flow path 80 from within the fire extinguisher 19, through the top housing 30. With the valve 95 in the closed position, the fire extinguisher 19 can remain in a pressurized condition after the pressurized gas cartridge 50 has been punctured. In this "primed" condition all of the pressure and fire suppressant material 99 within the fire extinguisher 19 is controlled by the valve 95. The dispensing nozzle 96 has a valve 95 that is connected to a control rod 94. The control rod 94 is pulled back to permit flow from the hose 81 to the exit port 90.

An operator can hold dispensing nozzle 96 of the fire extinguisher 19 in one hand and operate the lever 92 with the same hand. The operator can then direct the dispensing nozzle 96 at the fire. When the lever 92 is depressed, the lever will press against spring 93 and slide the control rod 94 to open the operable valve 95. When the operable valve 95 is opened fire suppressant material 99 will flow out of the exit port 90. When the control valve lever 92 is released the spring 93 will close the valve 95 to prevent further dispensing of fire suppressant material 99. This will retain pressure within the chamber 22 of fire extinguisher 19.

Figure 4:
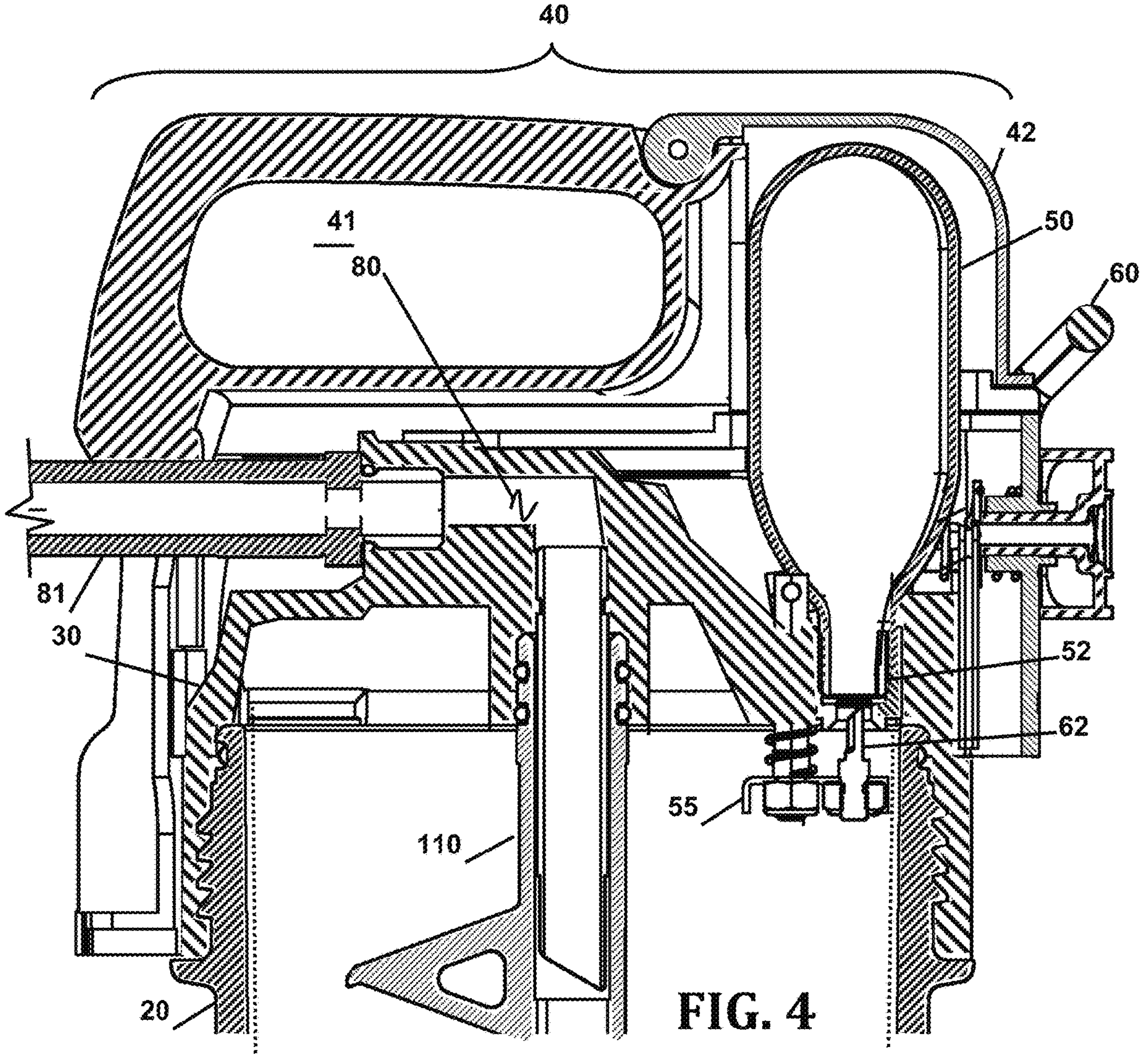
FIG. 4 shows a sectional view of a head of the fire extinguisher according to an exemplary embodiment.

FIG. 4 shows a sectional view of the top housing 30 of the fire extinguisher 19. The handle 40 allows the operator to hold the fire extinguisher 19 by placing a hand through the grip area 41. Trigger mechanism 60 is connected to a lift plate 55 that lifts the puncture pin 62 into the sealed end of the pressurized gas cartridge 50 under the enclosing cover 44 of the handle 40. The enclosing cover 44 may have a transparent portion 42. The pressurized gas cartridge 50 is secured by threads 52 or otherwise secured into the top housing 30. Detail of the trigger mechanism 60 and the puncture pin 62 is shown and described in more detail in FIGS. 5 and 6. When cartridge 50 is filled with compressed liquid $CO_2$, the flow path between the pressurized gas cartridge 50 and the inside of the fire extinguisher 19 must be as smooth as possible to limit the risk of dry ice forming that can block or restrict the flow path. The bottom housing 20 is shown connected to the top housing 30. When operable valve 95 is opened, static pressure from $CO_2$ or compressed gas from the gas cartridge 50 pushes the fire suppressant material 99 down into the openings of central shaft 110 and up through integral siphon tube 112 and then through the flow path 80 to the hose 81. If seals 109 leak with respect to top housing 30, gas from gas cartridge 50 will bypass suppressant material 99 and travel directly into flow path 80 and eventually out valve 95, leading to reduced range and discharge amount of suppressant material 99. To ensure proper assembly of seals 109 to top housing 30, guide features of the top housing 30 capture central shaft 110 during installation of bottom housing 20 to top housing 30.

Figure 5A:
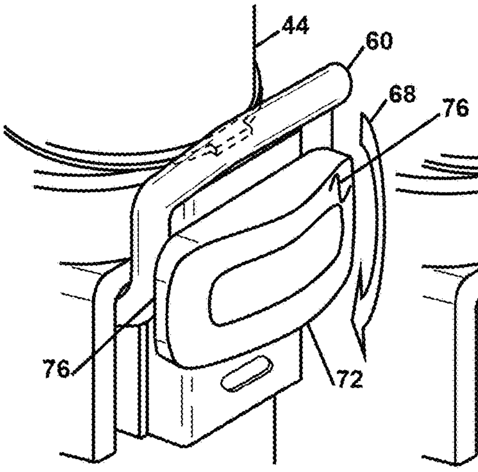
FIGS. 5A, 5B and 5C show stages of removing the safety device prior to discharging a fire extinguisher according to an exemplary embodiment.
Figure 5B:
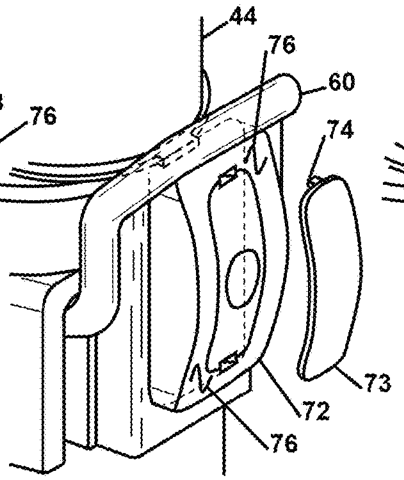
Figure 5C:
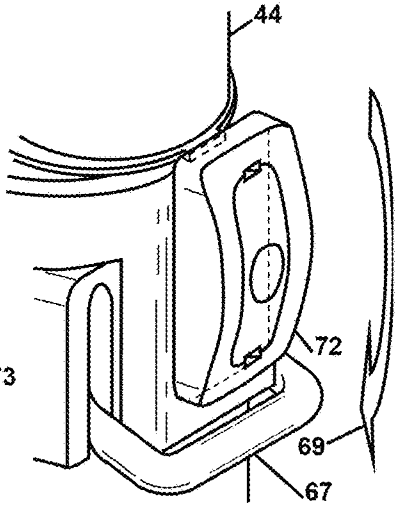

FIGS. 5A, 5B and 5C show stages of repositioning the safety knob 72 prior to discharging the fire extinguisher 19. The initial stage at 5A is how the fire extinguisher 19 will exist prior to activation. In this position the safety knob 72 restricts the trigger mechanism 60 from moving. The safety knob 72 is essentially rectangular thereby locking or blocking the trigger mechanism 60 in one orientation and allowing the sides of the trigger mechanism 60 to pass by the safety knob 72 when the safety knob 72 is rotated 90 degrees. The opposing vertical sides of the trigger mechanism 60 are secured with flange portions 76 of safety knob 72. To allow for activation, safety knob 72 is rotated 68. Safety knob 72 can be operated by either hand.

In FIG. 5B the safety knob 72 is shown in the vertical orientation to allow the trigger mechanism 60 to pass by the sides of the safety knob 72. When the safety knob 72 is rotated, the rotation causes internal pins 74 of the tamper mechanism 73 to shear and release or eject the tamper mechanism 73 indicator. The release of the tamper mechanism 73 indicator identifies that the fire extinguisher 19 may have been discharged and requires service inspection. Also, when the safety knob 72 is in the vertical orientation, access to the gas cartridge 50 by opening transparent portion 42 of handle 40 has been blocked. The design prevents the insertion of a new pressurized gas cartridge 50 without the trigger mechanism 60 returned to an upright and locked orientation to prevent puncturing the new pressurized gas cartridge 50 upon insertion.

In FIG. 5C an operator can then pull or push the trigger mechanism 60 downward 69 to where the trigger mechanism 60 is shown in a lower position 67 (as dashed lines). When the trigger mechanism 60 is rotated from the upper to the lower position 67 the puncture pin 62 is pushed into and punctures the pressurized gas cartridge 50. The trigger mechanism 60 can be operated by either hand.

Figure 6:
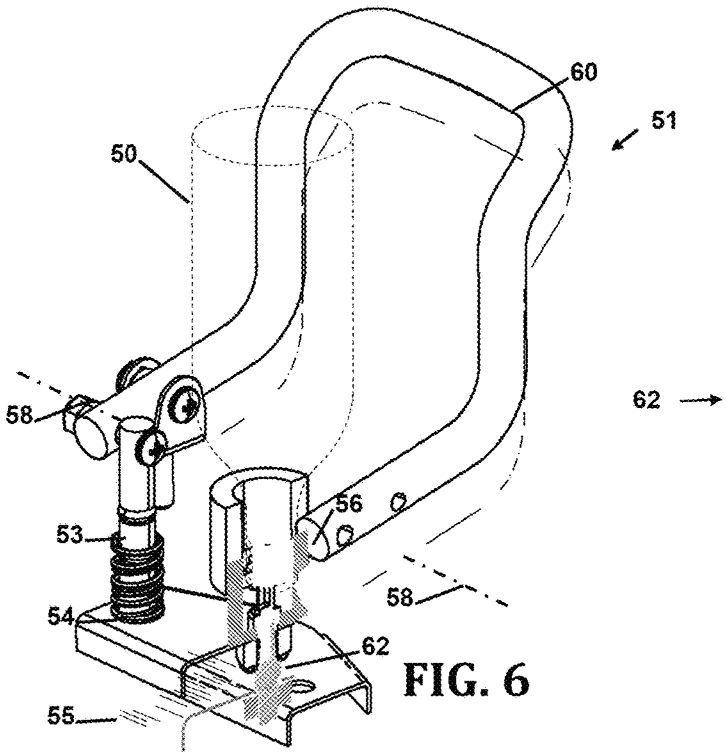
FIG. 6 shows a detailed view of a pressurized gas cartridge puncturing opening mechanism according to an exemplary embodiment.

FIG. 6 shows a detailed view of the pressurized gas cartridge 50 puncturing opening mechanism 51. The pressurized gas cartridge 50 is secured by threads 52 into a retainer 56 within the top housing 30. The pressurized gas cartridge 50 and the threaded retainer 56 remain stationary as the end of the pressurized gas cartridge 50 is punctured. From this figure, one set of fasteners and duplicate parts has been removed for viewing. The trigger mechanism 60 pivots through an axis 58 to increase the mechanical advantage to puncture the end of the pressurized gas cartridge 50. The free ends of the trigger mechanism 60 are connected to lift rods 53 and return springs 54 that maintain the trigger mechanism 60 in a normal condition where the puncture pin 62 is not in contact with the end of the pressurized gas cartridge 50. Lift rods 53 (only one shown) are connected together and operate in unison to lift the lift plate 55 in a parallel relationship to raise the puncture pin 62 in a linear motion.

Figure 7:
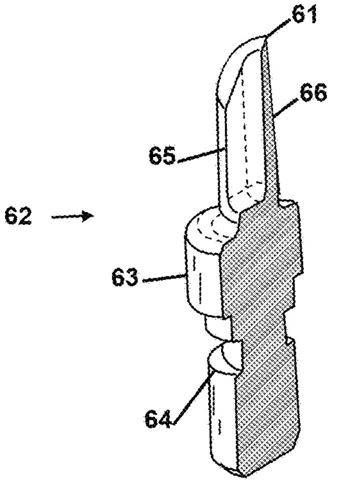
FIG. 7 shows a detail cross-sectional view of a puncture pin according to an exemplary embodiment.

FIG. 7 shows a detail cross-sectional view of the puncture pin 62. The puncture pin 62 has a pointed end 61 to puncture the seal on the end of the pressurized gas cartridge 50. A partially hollowed center 65 allows gas or liquid $CO_2$ to pass from the pressurized gas cartridge 50 into the chamber 22 of the fire extinguisher 19 even when puncture pin 62 is held in the puncturing position within gas cartridge 50. The puncture pin 62 has a taper 66 to increase the size of the hole as the pin is inserted into the pressurized gas cartridge 50 and the taper 66 provides draft for the pin to readily eject from cartridge 50 via force applies by return springs 54. One end of the puncture pin 62 has assembly feature 64 where the puncture pin 62 is retained onto the lift plate 55. An enlarged shank 63 supports the puncture pin 62 between the assembly feature 64 and the partially hollowed center 65. Since the puncture pin 62 is rigidly supported, inadvertent puncturing of gas cartridge 50 during drop event or rough usage is avoided.

Fire extinguishers generally require approval from regulatory agencies such as Underwriters Laboratory (UL). For most fire extinguishers the housing is pressurized. The fire extinguisher disclosed in this document uses a separate pressurized cartridge 50 that is filled with liquefied gas that must exit the cartridge 50 and expand into the bottom housing 20.

For cartridge-operated extinguishers an interval of 5 seconds is able to elapse after the cartridge is punctured in order that pressure builds up before discharge of the agent is initiated. An extinguisher shall have duration of discharge not less than either 8 seconds, or the minimum duration specified in the Standard for Rating and Fire Testing of Fire Extinguishers.

When the charged extinguisher is held in a vertical position, with the discharge nozzle in the horizontal position. The extinguisher then is to be discharged, and the duration to gas point and amount of dry chemical discharged recorded.

Based upon the ambient temperature and the orientation of the gas canister, different amounts of dry ice (solid CO2) is retained within a CO2 cartridge when discharged vertically upward; conversely, a minimum amount of dry ice was retained when discharged vertically downward.

Figure 8:
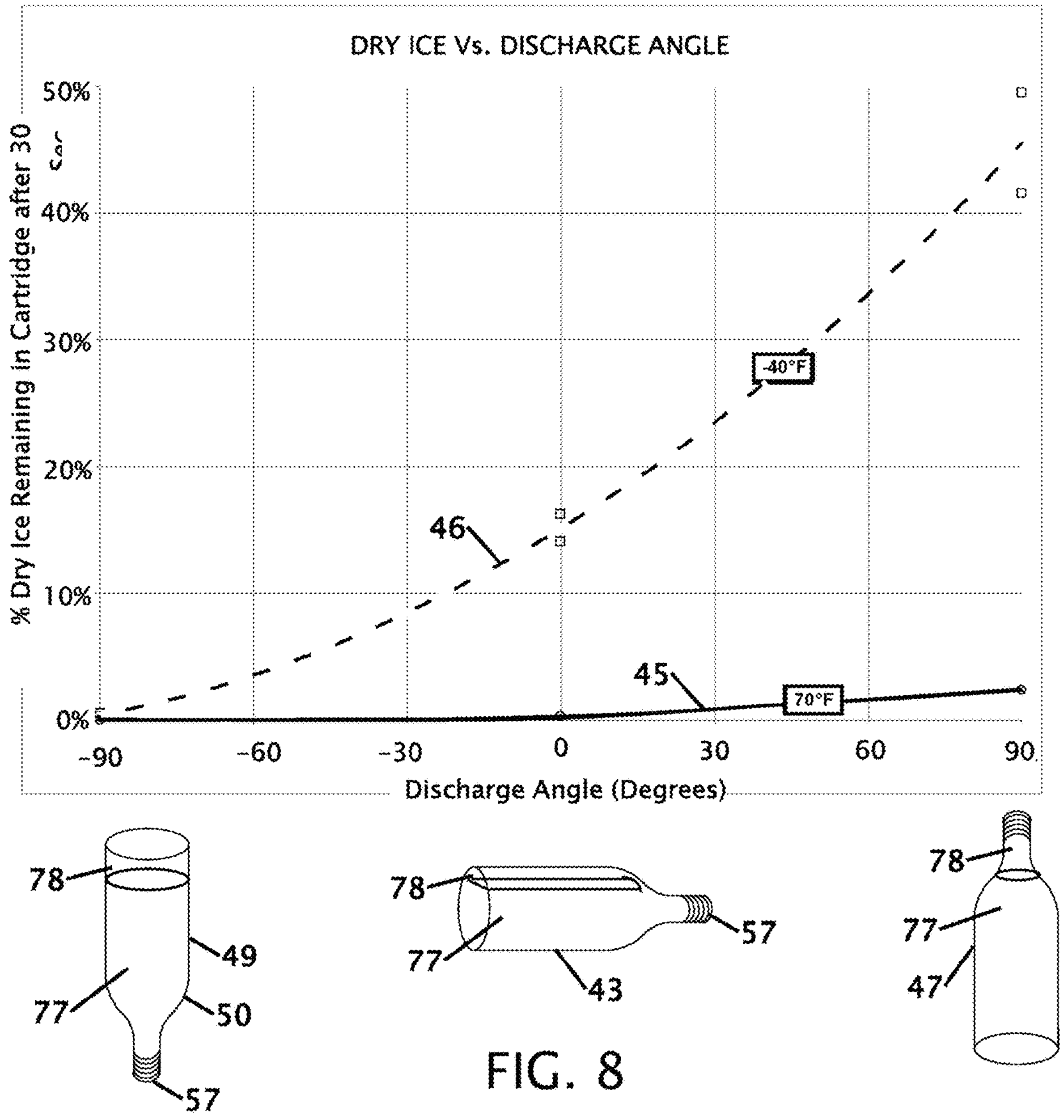
FIG. 8 shows a graph of the amount of Dry Ice that is generated based upon the orientation of the pressurized gas according to an exemplary embodiment.

FIG. 8 shows a graph of the amount of Dry Ice that is generated based upon the orientation of the pressurized gas. The graph shows the amount of Dry Ice at the temperatures of 70° F. 45 and −40° F. 46. At 70° F. nearly all orientation positions show that very little Dry Ice is generated. At −40° F. the amount of Dry Ice can go from a high of over 40% when the cartridge is in a vertical orientation 47, or about 15% when the cartridge 48 is in a horizontal 43 to almost 0% when the cartridge 50 is inverted 49 with the seal 57 on the bottom. In this orientation the liquefied gas 77 is on the seal 57 and the vaporized gas 78 is on the top of the gas cartridge 50. The inverted cartridge 50 pushes liquid CO2 out of the cartridge 50 as the liquid within the CO2 cartridge 50 of the lighter weight vaporized gas pushes the heavier liquid within the CO2 out of the opening of the cartridge 50 as the cartridge is engaged into the fire extinguisher 19.

These results were measured when pressurized liquid CO2 cartridges were conditioned at either 70° F. or −40° F. and then discharged in various orientations. Dry ice remaining within the cartridges was measured 30 seconds after puncturing the cartridge.

Figure 9:
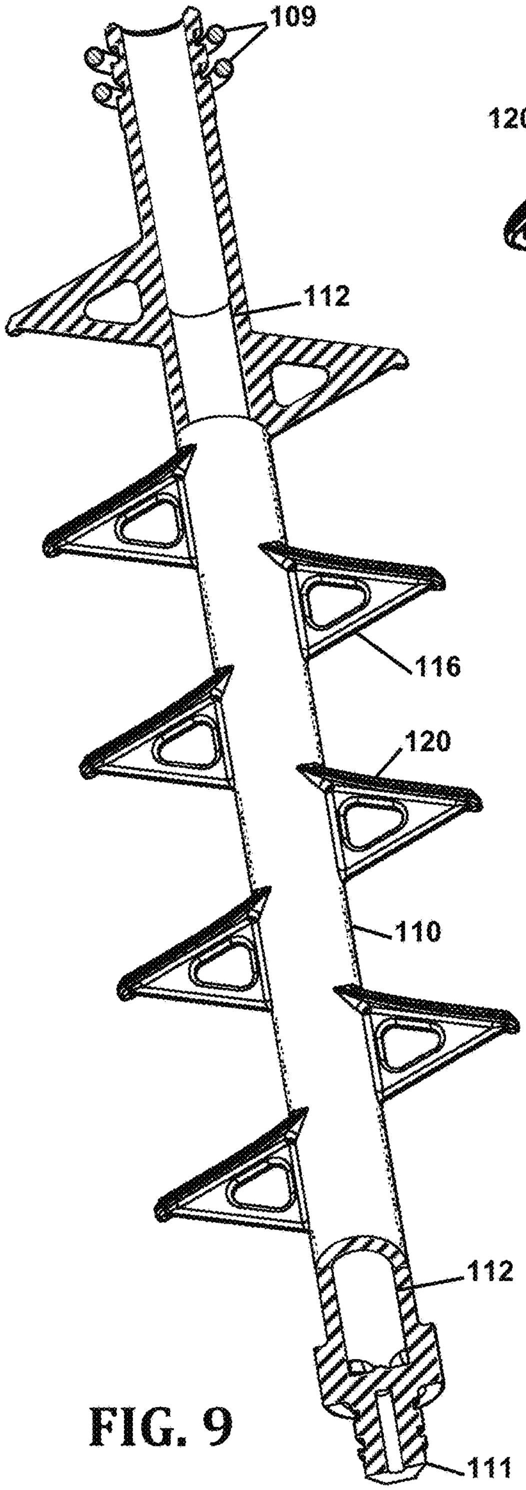
FIG. 9 shows a fluffing and siphon tube according to an exemplary embodiment.

FIG. 9 shows the fluffing arms 120 and integral siphon tube 112. In this preferred embodiment the fluffing arms 120 and integral siphon tube 112 are fabricated as a single unit around a central shaft 110. While this embodiment shows a siphon tube 112 with fluffing arms or blades 120, some embodiments are contemplated that may not incorporate the fluffing arms or blades 120. The inclusion of the fluffing arms or blades 120 is generally dictated by the capacity and rating of the fire extinguisher. The bottom cap 111 of the central shaft 110 fits into the bottom of the fire extinguisher 19. Seals around the bottom cap 111 prevent pressurized gas from passing out of the bottom of the fire extinguisher 19. Seals 109 on the upper end of the central shaft 110 prevent bypass of pressurized gas directly into flow path 80 and eventually out valve 95, leading to reduced range and discharge amount of suppressant material 99. The seals 109 and the seals around the bottom cap 111 allow for the central shaft 110 to be rotated within the fire extinguisher 19. To aide in manufacturing, bottom cap 111, integral siphon tube 112, and/or fluffing arms 120 may be separate parts or combined in any efficient manner.

The integral siphon tube 112 is constructed with an elongated tube member 119 having the blades 120 molded with the elongated tube. A bottom cap 111 is secured to the elongated tube 119 by ultrasonic welding or the like.

Because the pressurized gas cartridge 50 is inverted, essentially only liquefied gas exits and expands into gas within the fire extinguisher 19 therefore essentially all of the gas within the cartridge is expelled. Because the liquid/gas is expelled at a rapid rate a pressure wave 113 traveling nearly the speed of sound pushes onto the top of the fluffing arms 120. A gusset 116 supports the fluffing arm 120 and prevents the fluffing arm 120 from being sheared off by the pressure wave. In a short period of time, pressure within the fire extinguisher 19 stabilizes. Once operable valve 95 is opened, the static pressure within chamber 22 pushes the fire suppressant material 99 toward at least one intake hole 114 in the bottom of the central shaft 110 shown in the other figures herein.

Figure 10:
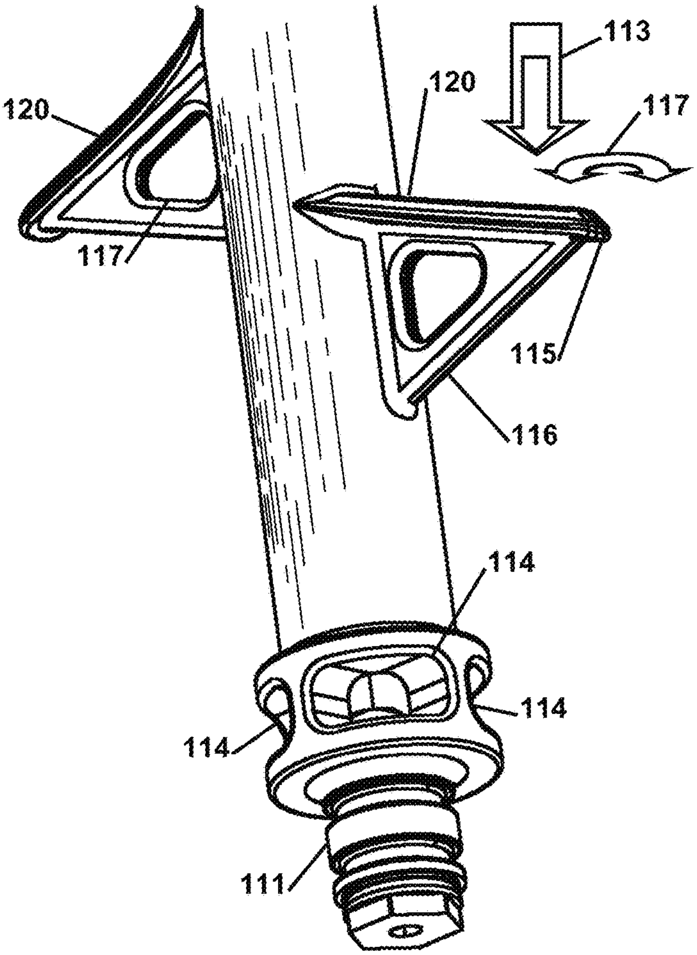
FIG. 10 shows a detail of multiple siphon intake holes and a fluffing arm according to an exemplary embodiment.

FIG. 10 shows a detail of the multiple intake holes 114 and the fluffing arm(s) 120. The fluffing arms 120 are narrow, crowned, staggered, and tapered 115 to minimize turning resistance while maximizing mixing of packed fire suppressant material 99 and flow of pressurized suppressant material 99 during discharge. Holes 117 in the fluffing arms 120 allow fire suppressant material 99 to pass around the fluffing arms 120 and the support gusset 116. The pressure wave 113 of liquefied gas is shown pushing down on the arm 120. The bottom of the central shaft 110 shows the multiple intake holes 114 where the fire suppressant material 99 is pushed or siphoned into the intake holes 114 and through the integral siphon tube 112 where they can exit the fire extinguisher 19 through the hose 81 and dispensing nozzle 96. The bottom seals exist in recesses in the bottom cap 111 of the central shaft 110. The lower portion 118 of the bottom cap 111 is configured with a head for external gripping with a wheel that allows the central shaft 110 to be rotated externally. In this embodiment the drive is shaped like a "+", but other shapes are contemplated that will provide essentially equivalent capability.

Thus, specific embodiments of a portable fire extinguisher have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A portable fire extinguisher including a chamber configured to be filled with a dry fire suppressant material and to be pressurized with gas from a pressurized gas cartridge, the portable fire extinguisher further including a flow path for releasing the fire suppressant material from the chamber, the portable fire extinguisher comprising:

an integral siphon tube having a first tube end coupled to the flow path and a second tube end disposed inside the chamber;

a puncture pin disposed in the chamber such that the puncture pin releases liquefied gas from the pressurized gas cartridge directly into the chamber such that a stream of liquefied gas enters the chamber in an orientation that is parallel to an axis of the siphon tube and is directed at the dry fire suppressant material, the pressurized gas cartridge located externally from the chamber;

at least two fluffing arms disposed in the chamber and configured to agitate the dry fire suppressant material in the chamber when the integral siphon tube is rotated, wherein each fluffing arm includes a first end coupled to the integral siphon tube and the fluffing arm extends radially away from the integral siphon tube to a second end inside the chamber, an upper surface of the fluffing arm sloped along its length away from the first tube end; and a support gusset coupled to the integral siphon tube and where a portion of the support gusset extends to a point adjacent to the second end one of the at least two fluffing arms, wherein the support gusset extends radially away from the integral siphon tube inside of the chamber and supports at least a portion of the fluffing arm, the support gusset adapted to resist a compressive force from the stream of liquefied gas from the pressurized gas cartridge applied to the fluffing arm where such force is applied in a direction that is parallel to the axis of the integral siphon tube.

2. The portable fire extinguisher of claim 1, wherein the support gusset includes a hole that is configured to pass a portion of the fire suppressant material therethrough when the integral siphon tube is rotated.

3. The portable fire extinguisher of claim 2, wherein the support gusset is a triangular structure including:

a first portion that extends along the integral siphon tube;

a second portion that extends from a first side of the first portion to a distal gusset end, wherein the second portion is coupled to the fluffing arm along a length of the fluffing arm; and a third portion that extends from a second side of the first portion to the distal gusset end;

wherein the hole is bounded by the first, second, and third portions of the support gusset.

4. The portable fire extinguisher of claim 1, wherein the fluffing arm includes a top surface and a bottom surface that has a greater area than the top surface such that the fluffing arm has a tapered cross-section.

5. The portable fire extinguisher of claim 1, wherein the fluffing arm is a crowned structure.

6. The portable fire extinguisher of claim 1, wherein the second tube end is coupled to an intake hole comprising multiple different holes distributed radially about the integral siphon tube.

7. The portable fire extinguisher of claim 1, wherein the fluffing arm is configured to withstand a pressure wave caused by a sudden release of liquefied gas from the pressurized gas cartridge into the chamber.

8. The portable fire extinguisher of claim 1, wherein the integral siphon tube includes an inlet at a first end of the integral siphon tube and an outlet at an opposite second end of the integral siphon tube, wherein the inlet is configured to receive the fire suppressant material from the chamber and the outlet is configured to provide the fire suppressant material to the flow path.

9. The portable fire extinguisher of claim 1, further comprising a retainer for the pressurized gas cartridge configured to retain the pressurized gas cartridge in an inverted position such that contents of the pressurized gas cartridge are expelled from the pressurized gas cartridge toward the second tube end.

10. The portable fire extinguisher of claim 1, wherein the puncture pin is a hollow pin configured to puncture the pressurized gas cartridge and release liquefied gas from the pressurized gas cartridge into the chamber.

11. A method of maintaining fire suppressant material housed in a fire extinguisher, the method comprising:

configuring the fire extinguisher to comprise a chamber filled with a dry fire suppressant material, the chamber configured to be pressurized with liquefied gas released by a puncture pin directly into the chamber from a pressurized gas cartridge located externally from the chamber, the puncture pin disposed in the chamber, the portable fire extinguisher further configured with a flow path for releasing the dry fire suppressant material from the chamber, the portable fire extinguisher comprising an integral siphon tube having a first tube end coupled to the flow path and a second tube end disposed inside the chamber;

agitating the fire suppressant material in the chamber using at least two fluffing arms disposed in the chamber and configured to agitate the dry fire suppressant material when the integral siphon tube is rotated, wherein each fluffing arm includes a first end coupled to the integral siphon tube and the fluffing arm extends radially away from the integral siphon tube to an opposite second end inside the chamber, each fluffing arm further comprising an upper surface of the fluffing arm sloped along its length away from the first tube end, each fluffing arm comprising a support gusset coupled to the integral siphon tube and to a point adjacent to the a distal end of the fluffing arm, wherein the support gusset extends radially away from the integral siphon tube inside of the chamber and supports at least a portion of the fluffing arm, the support gusset adapted to resist a compressive force from a stream of liquefied gas introduced directly into the chamber from the pressurized gas cartridge in an orientation that is parallel to an axis of the siphon tube and applied to the fluffing arm where such force is applied in a direction that is parallel to the axis of the integral siphon tube.

12. The method of claim 11, wherein the support gusset includes a hole that is configured to pass a portion of the fire suppressant material therethrough when the integral siphon tube is rotated.

13. The method of claim 12, wherein the support gusset is a triangular structure comprising:

a first portion that extends along the integral siphon tube;

a second portion that extends from a first side of the first portion to a distal gusset end, wherein the second portion is coupled to the fluffing arm along a length of the fluffing arm; and a third portion that extends from a second side of the first portion to the distal gusset end;

wherein the hole is bounded by the first, second, and third portions of the support gusset.

14. The method of claim 11, wherein the fluffing arm includes a top surface and a bottom surface that has a greater area than the top surface such that the fluffing arm has a tapered cross-section.

15. The method of claim 11, wherein the second tube end is coupled to an intake hole comprising multiple different holes distributed radially about the integral siphon tube.

16. The method of claim 11, wherein the fluffing arm is configured to withstand a pressure wave caused by a sudden release of liquid from the pressurized gas cartridge into the chamber.

17. The method of claim 11, wherein the integral siphon tube includes an inlet at a first end of the integral siphon tube and an outlet at an opposite second end of the integral siphon tube, wherein the inlet is configured to receive the fire suppressant material from the chamber and the outlet is configured to provide the fire suppressant material to the flow path.

18. The method of claim 11, wherein, the fire extinguisher is further configured with a retainer configured to retain the pressurized gas cartridge in an inverted position such that contents of the gas cartridge are expelled from the pressurized gas cartridge toward the second tube end.

19. A portable fire extinguisher including a chamber configured to be filled with a dry fire suppressant material and to be pressurized with gas from a pressurized gas cartridge, the portable fire extinguisher further including a flow path for releasing the fire suppressant material from the chamber, the portable fire extinguisher comprising:

an integral siphon tube having a first tube end coupled to the flow path and a second tube end disposed inside the chamber;

a puncture pin disposed in the chamber such that the puncture pin releases liquefied gas from the pressurized gas cartridge directly into the chamber in an orientation that is parallel to an axis of the siphon tube and where the liquefied gas is directed at the dry fire suppressant material in a direction parallel to the siphon tube, the pressurized gas cartridge located externally to the chamber;

at least two fluffing arms disposed in the chamber and configured to agitate the dry fire suppressant material in the chamber when the integral siphon tube is rotated, wherein each fluffing arm includes a first end coupled to the integral siphon tube and the fluffing arm extends radially away from the integral siphon tube to an opposite second end inside the chamber, an upper surface of the fluffing arm sloped along its length away from the first tube end, the integral siphon tube includes an inlet at a first end of the integral siphon tube and an outlet at an opposite second end of the integral siphon tube, wherein the inlet is configured to receive the fire suppressant material from the chamber and the outlet is configured to provide the fire suppressant material to the flow path; and a support gusset coupled to the integral siphon tube and where a portion of the support gusset extends to a point adjacent to the second end one of the at least two fluffing arms, wherein the support gusset extends radially away from the integral siphon tube inside of the chamber and supports at least a portion of the fluffing arm, the support gusset adapted to resist a compressive force from a stream of liquefied gas from the pressurized gas cartridge applied to the fluffing arm where such force is applied in a direction that is parallel to the axis of the integral siphon tube.

20. The portable fire extinguisher of claim 19, further comprising a retainer configured to retain the pressurized gas cartridge in an inverted position such that contents of the gas cartridge are expelled from the pressurized gas cartridge toward the second tube end.

* * * * *